United States Patent

[11] 3,595,063

| [72] | Inventor | Johannes Martin Loew<br>Tailfingen, Germany |
|------|----------|---------------------------------------------|
| [21] | Appl. No. | 846,180 |
| [22] | Filed | July 30, 1969 |
| [45] | Patented | July 27, 1971 |
| [73] | Assignee | Fritz, Hellige & Co., G.m.b.H.<br>Freiburg im Breisgau, Germany |
| [32] | Priority | July 31, 1968 |
| [33] | | Germany |
| [31] | | P 17 73 950.3 |

[54] GAS ANALYZER SYSTEM
5 Claims, 5 Drawing Figs.

| [52] | U.S. Cl. | 73/23 |
| [51] | Int. Cl. | G01n 31/00 |
| [50] | Field of Search | 73/23, 19,<br>421.5, 422 GC; 23/254, 255; 222/193; 128/2.08 |

[56] References Cited
UNITED STATES PATENTS

| 2,084,954 | 6/1937 | Griswold | 23/255 X |
| 2,889,856 | 6/1959 | Mognuson | 222/193 X |
| 3,318,149 | 5/1967 | Varadi | 73/23.1 |
| 3,338,087 | 7/1967 | Moberg et al. | 73/23 |
| 3,507,146 | 4/1970 | Webb | 73/23 |

Primary Examiner—
Attorneys—Franklin D. Jankosky, Alfred B. Levine, Richard Zentner and Alan C. Rose ABSTRACT: A gas analyzer system incorporating a mixing chamber, having a diffusion member, for combining a stream of mixing gas with a stream of carrying gas, such carrying gas containing a certain gas, the quantity of which transported in a unit of time will be determined by the gas analyzer system. The mixing chamber combines the aforementioned streams of gas to form a measuring gas which is then analyzed by the system. The system further includes an input pump and an output pump connected to the mixing chamber so as to provide equal quantities of gas transport per unit time within the mixing chamber. A diffusion container may be incorporated between the output pump and the analyzing portion of the system so as to further ensure proper diffusion of the gases.

PATENTED JUL 27 1971

INVENTOR:
Johannes Martin Loew

By Franklin D. Jankowsky
ATTORNEY

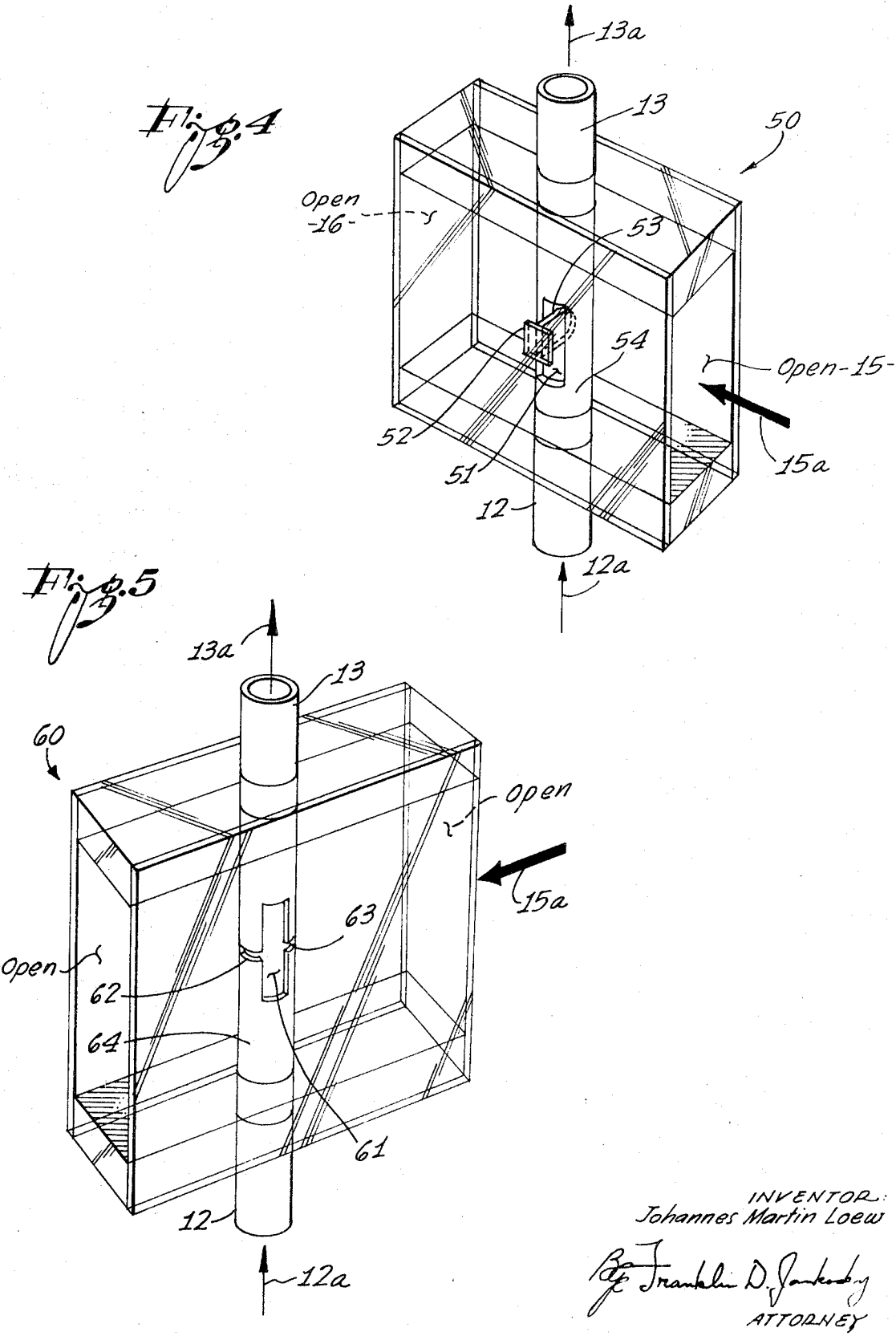

GAS ANALYZER SYSTEM

FIELD OF THE INVENTION

This invention relates to gas analyzer systems and more particularly to a novel gas analyzer system incorporating a mixing chamber for combining a stream of mixing gas with a stream of carrying gas, such carrying gas containing a certain gas, the quantity of which transported in a unit of time will be determined by the gas analyzer system.

DESCRIPTION OF THE PRIOR ART

In the past, in order to make a determination of the strength of the flow of breath and the quantity of carbon dioxide expirated by an individual, separate measurements had to be conducted. The results of the separate measurements had to be compared in order to determine the quantity of the expirated carbon dioxide. In the prior art, mixing chambers were not utilized, and heavy, large diameter connection hoses were necessary in order to conduct the proper flow of breath to volumeters. Furthermore, the prior art instruments did not allow successful continual measurement and determination of the quantities of the components of the respiration gases, nor was the individual able to move about the area without considerable trouble.

Accordingly, it is an object of the present invention to provide a novel gas analyzer system for continually measuring and determining quantities of the components of respiration gases.

It is a further object of the present invention to provide a novel gas analyzer system utilizing a mixing chamber.

It is a still further object of the present invention to provide a novel gas analyzer system that utilizes lightweight instrumentation that may be easily carried by an individual.

It is another object of the present invention to provide a novel gas analyzer system having lightweight hose connections of a small diameter that allowed an individual to move freely about during a test.

SUMMARY OF THE INVENTION

In accordance with the objects set forth above, the present invention provides a gas analyzer system incorporating a mixing chamber for combining a stream of mixing gas with a stream of carrying gas, such carrying gas containing a certain gas, the quantity of which transported in a unit of time will be determined by the gas analyzer system. The output of the mixing chamber may then be directly routed to the gas analyzer portion of the system. In addition, the output of the mixing chamber may be routed through a diffusion chamber before the quantity of the certain gas is determined by the analyzer portion of the system.

BRIEF DESCRIPTION OF THE DRAWINGS

Additional objects, advantages, and characteristic features of the present invention will become readily apparent from a brief description of the preferred embodiments of the invention when taken in conjunction with the following drawing in which:

FIG. 4 is a perspective view of another embodiment of a mixing chamber of a gas analyzer system in accordance with the present invention; and FIG. 5 is a perspective view of still another embodiment of a mixing chamber of a gas analyzer system in accordance with the present invention.

DESCRIPTION OF THE PREFERRED EMBODIMENTS

Figure 1:
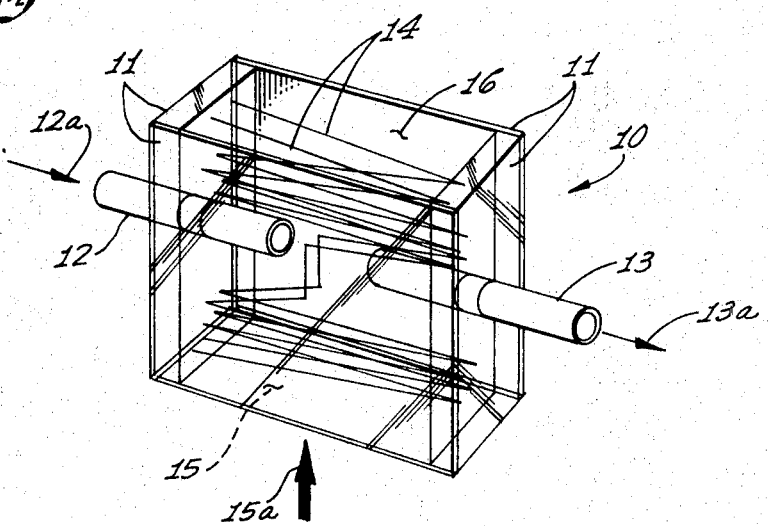
FIG. 1 is a perspective view of a mixing chamber of a gas analyzer system in accordance with the present invention.

Referring now to FIG. 1, there is shown a mixing chamber 10 constructed in accordance with the principles of this invention. The mixing chamber 10 is comprised of a casing 11, an input gas hose 12, an output gas hose 13, and a diffusion member 14. The casing 11 may be constructed of any material, for example, one of the constructed models of the casing 11, including the two ends that retain the respective gas hoses 12 and 13, and the front and back portions were constructed of plastic. These four sides of the casing 11, as constructed, provide openings 15 and 16. The gas hoses 12 and 13 may be constructed of plastic, rubber, or other suitable flexible material, or the hoses may be rigid and then may be connected to flexible tubing, not shown, so as to enable an individual to move freely about during a test. The diffusion member 14 is shown in a zigzag configuration and may be constructed of wire mesh, steel-wool, plastic material, or any other suitable material that would diffuse or tend to mix any gases inserted into the mixing chamber 10. In one of the constructed models of the mixing chamber 10, the height of the chamber 10 between the openings 15 and 16 was between 15 and 20 millimeters, and the width of the chamber 10 was of approximately the same value or smaller.

Through various tests conducted on the mixing chamber 10, it was determined that the steepness of the calibration curve was dependent not only upon the distance between the ends of tubes 12 and 13 within the mixing chamber 10, the inner shape and size of the mixing chamber 10, but was principally dependent upon the arrangement of the diffusion member 14. Therefore, the diffusion member 14 may be of different size and construction, i.e., the size and arrangement diffusion member 14 may be varied so as to adjust the turbulence in the mixing chamber. In order to maintain the temperature in the measuring cycle constant and above all to prevent the condensation of water in the mixing chamber 10, it is expedient to heat the mixing air to a temperature of approximately 37° C and to maintain that temperature. Thus, the measuring procedure is simplified by removing a variable parameter.

The purpose of the mixing chamber is to mix gases from two inputs in order that the quantity of a component of one or two inputs may be determined and recorded by a gas analyzer system. For example, in order to determine the quantity of carbon dioxide in the breath of an individual, the breath of the individual, hereinafter sometimes referred to as "carrying gas" is applied to one input of the mixing chamber and another gas, hereinafter referred to as "mixing gas," which does not contain carbon dioxide, is mixed within the mixing chamber 10, and the combination of these two inputs is the output of the mixing chamber 10, hereinafter referred to as "measuring gas."

Thus, the chief advantage of the invention is achieved, namely, the quantity of carbon dioxide in the measuring gas, which is analyzed is directly proportioned to the quantity of carbon dioxide with the breath in a unit of time. This method of determination is especially important for the examination of the metabolism and of the lung function because it is possible to immediately obtain a direct parameter of the respiration of oxygen and of the expiration of carbon dioxide of the individual being examined. This method can be utilized for continually determining the quantity of any questioned gas in a carrying gas, e.g., for anesthesia purposes and for technical gas besides the aforementioned oxygen and carbon dioxide. Radioactive isotopes may be placed in certain gases, then the quantitative recording of radioactive isotopes in a carrying gas containing such certain gases may be determined by means of appropriate measuring devices after having traveled through the mixing chamber 10 to determine the quantity of a certain gas in the carrying gas.

In the operation of the mixing chamber 10, an individual may breathe into the mixing chamber 10 via the opening 15, in the direction of an arrow 15a. A suitable mouthpiece, not shown, may be inserted between the individual and the opening 15. Into the first airhose 12, in the direction of an arrow 12a, a stream of mixing air, which does not contain any carbon dioxide, is supplied by external means, not shown. The diffusion member 14 diffuses the two inputs to the mixing chamber 10 so that measuring gas that exits the tube 13, in the direction of an arrow 13a, represents a true combination of the two input gases.

It should be understood that the term "gas" means any type of gas, including air. Furthermore, the term "carrying gas" means a gas containing an unknown quantity of a certain gas, while the term "mixing gas" means another gas that does not contain any of such certain gas.

Figure 2:
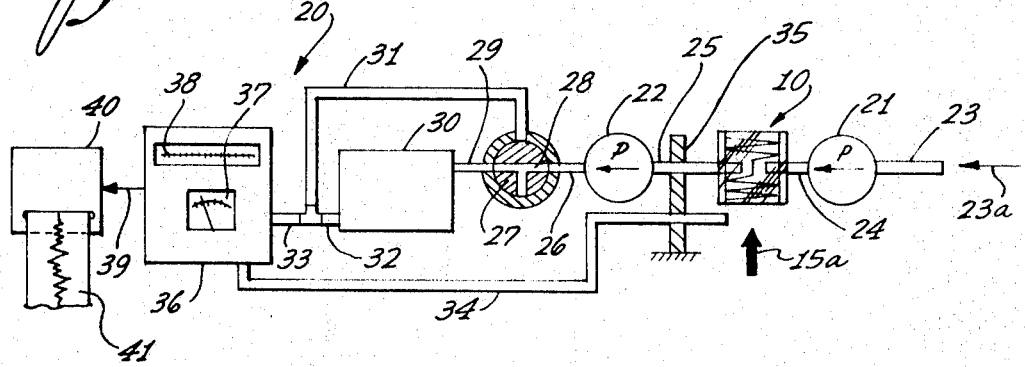
FIG. 2 is a functional block diagram of a gas analyzer system in accordance with the present invention.

Referring now to FIG. 2, there is shown a gas analyzer system constructed in accordance with the principles of this invention. The gas analyzer system 20 is comprised of a mixing chamber 10, as illustrated in FIG. 1, an input pump 21, an output pump 22, a bypass value 27, a mixing container 30, an analysis instrument 36, a recording device 40, and numerous interconnections which will be discussed in detail further in the specification.

In a simple utilization of the gas analyzer system 20, a three valve member 28 of the bypass valve 27 would be rotated 90° in the counterclockwise position so as to bypass the mixing container 30. In the operation of the gas analyzer system 20 in this simple configuration, an individual would breathe into the mixing chamber 10, as illustrated by an arrow 15a, and the mixing gas will be supplied to a tube 23, in the direction of an arrow 23a. The mixing chamber 10 would operate as earlier described in the discussion referring to FIG. 1. However, the input pump 21 and the output pump 22, which may be suitable pumps, such as standard diaphragm pumps or centrifugal blowers. The pumps 21 and 22 may be adjusted to provide equal quantities of gas transport per unit time within the mixing chamber 10, for example, this may be adjusted to 1 liter per minute. In one particular test, the time of washing out of the mixing chamber 10 was approximately 0.05 seconds for a space content of 0.8 ml. This test enabled the successful determination of carbon dioxide expirated during one breath. The mixing gas would be supplied to the mixing chamber 10 via a tube 24 and the output of the mixing chamber 10, or the measuring gas, would be supplied to the output pump via a tube 25. The measuring gas would then be supplied to the analysis instrument 36 via a tube 26, bypass valve 27, a tube 31 and a tube 33. The quantity of carbon dioxide could then be indicated on the readout 38 of the analyzer instrument 36. In order to provide a recorded readout of the quantity of carbon dioxide, the recording instrument 40 is connected to the analysis instrument 36 via the electrical connection 39. The readout on the recording instrument 40 could be in the form of a graph as illustrated by the numeral 41.

In order to get an integration of the expired quantities in connection with the determination of the value of breath per minute, the member 28 of the bypass valve 27 may be placed in the position as shown in FIG. 2. In the operation of the gas analyzer system 20, as presently illustrated, an individual would breathe into the mixing chamber 10, as illustrated by the arrow 15a, and the mixing gas would be supplied to the tube 23 in a direction of the arrow 23a. Thus, the measuring gas would travel to the mixing container 30 via the bypass valve 27 and a tube 29. The mixing container 30 may have the shape of an extended bottle so as to ensure proper diffusion of the measuring gas, e.g., its volume may be 250 mm. Then the measuring gas may travel to the analysis instrument 36 via the tubes 32 and 33. The tube 34 provides a direct path for the breath of an individual to the analyzer instrument 36 to determine the strength of the flow of breath for checking purposes. This determination may be displayed on an indicator 37. Holding means 35 may be utilized to maintain the tube 34 in close proximity to the mixing chamber 10.

Figure 3:
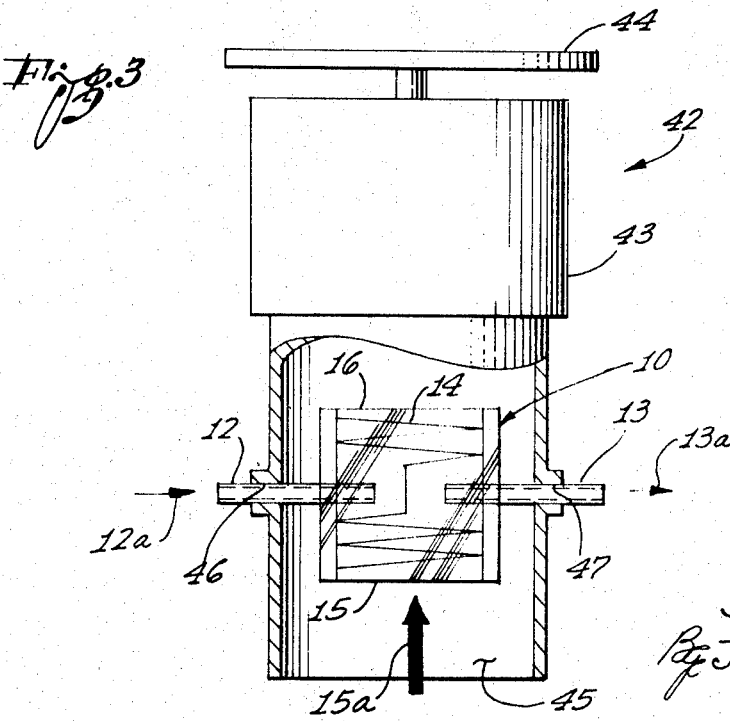
FIG. 3 is a perspective view of a mixing chamber of a gas analyzer system affixed to a plunger arrangement of a closed analyzer system in accordance with the present invention.

Referring now to FIG. 3, there is shown a mixing chamber 10, as illustrated in FIG. 1, enclosed within a plunger arrangement 42. The plunger arrangement 42 is one of a three-way valve arrangement, the others not being shown, which are the features of a closed gas analyzer system. The plunger arrangement comprises a cylindrical wall 43, a plunger 44, and an opening 45. Tubes 12 and 13 are similar to those of FIG. 1 and may be fixed in the plunger arrangement 42 and openings may be respectfully fixed in the plunger arrangement in a pair of openings 46 and 47. Other numerals illustrated in FIG. 3 designate the same features of the mixing chamber 10 as illustrated in FIG. 1. The operation of the mixing chamber 10 as illustrated in FIG. 3 operates the same as the mixing chamber of FIG. 1. The plunger 44 of the plunger arrangement 42 is automatically operated by the mechanical force of the expired and respired stream of breath 15a. FIG. 3 merely illustrates that the mixing chamber 10 may be utilized in a closed gas analyzer system as well as an open gas analyzer system.

Referring now to FIG. 4, there is shown a mixing chamber 50 in accordance with the principles of this invention. The mixing chamber 50 is similar to that of the mixing chamber 10 of FIG 1; however, the tube carrying the mixing gas is a continuous tube having the similar input section 12 and output section 13. The tube 54 has an opening 51 as illustrated in the drawing. In the opening 51 a tab 53 is inserted. The tab 53 is affixed to a member 52 which in turn is affixed to the front wall of the mixing chamber 50. The tab 53 tends to mix the breath of the individual illustrated by the arrow 15a, and the direction of the mixing air is illustrated by the arrow 12a. The tab 53 ensures that the mixing gas and the carrying gas are properly combined to form the measuring gas which exits the mixing chamber 50 via tube section 13.

Referring now to FIG. 5, there is shown a mixing chamber 60, similar to the mixing chamber 10 of FIG. 1, constructed in accordance with the principles of the present invention. As in FIG. 4, the tube 63 goes completely through the mixing chamber 60 and has an input section 12 and an output section 13. An opening 61 similar to the opening 51 of FIG. 4 is shown in the tube 64. Instead of having a tab 53 as in FIG. 4, this embodiment of the invention includes openings 62 and 63 which ensure that the mixing gas and the carrying gas are properly combined to form the measuring gas which exits the mixing chamber 60 via tube section 13.

Thus, although the present invention has been shown and described with reference to particular embodiments, for example, a mixing chamber including a diffusion member of a zigzag configuration, nevertheless, various changes and modifications obvious to a person skilled in the art to which this invention pertains, for example, diffusion members of a cross-hatched configuration, are deemed to lie within the spirit, scope, and contemplation of the invention as set forth in the appended claims.

What I claim is:

1. A gas analyzer system comprising:
   chamber means, having at least two inputs and one output, for mixing a carrying gas and a mixing gas that are supplied to said respective inputs to form a measuring gas;
   pump means connected to one of said inputs of said chamber means for supplying said mixing gas to said chamber means and further connected to said output of said chamber means for ensuring that the rate of flow of said gases through said chamber means remains constant;
   analyzer means for analyzing and indicating the quantity of components of said carrying gas;
   first path means, connected between said pump means and said analyzer means, for transferring the output of said pump means to said analyzer means;
   second path means in a parallel arrangement to said first path means, said second path means including mixing means for mixing said output of said pump means; and
   bypass means connected between said output of said pump means and said first path means and said second path means for selectively routing the output of said pump means through either of said path means.

2. A gas analyzer system as recited in claim 1 wherein said pump means includes an input pump connected to one input of said chamber means for supplying said mixing gas to said chamber means, and an output pump connected to said output of said chamber means and cooperating with said input pump for ensuring that the rate of flow of said gas through said chamber means remains constant.

3. A gas analyzer system as recited in claim 1 which further includes a third path means having one end connected to said analyzer means and the other end being located in proximity of said chamber means for allowing a portion of said carrying gas to be directly routed to said analyzer means in order that said measuring gas may be compared with said directly routed carrying gas.

4. A chamber incorporated within a gas analyzer system, for mixing a first gas with a second gas so as to provide a combined third gas, comprising:
 a casing having opposite open ends, one of said ends adapted to receive said first gas;
 transport means, located in two other opposite ends of said casing that are in quadrature to said open ends of said casing, for supplying said second gas to said chamber through one end of said transport means and for exiting said third gas from said chamber through the other end of said transport means, said transport means includes an opening therein located in proximity to the center of said transport means between the opposite ends of said transport means; and
 mixing means cooperating with said transport means for providing turbulence to ensure proper mixing of said first gas with said second gas to form said combined third gas, said mixing means having a tab located in said opening of said transport means.

5. A chamber incorporated within a gas analyzer system, for mixing a first gas with a second gas so as to provide a combined third gas, comprising:
 a casing having opposite open ends, one of said ends adapted to receive said first gas;
 transport means, located in two other opposite ends of said casing that are in quadrature to said open ends of said casing, for supplying said second gas to said chamber through one end of said transport means and for exiting said third gas from said chamber through the other end of said transport means; and
 mixing means cooperating with said transport means for providing turbulence to ensure proper mixing of said first gas with said second gas to form said combined third gas, said mixing means being a cross-shaped open configuration means located in proximity of the center of said transport means between the opposite ends of said transport means.